(12) United States Patent
Tateno

(10) Patent No.: US 8,510,235 B2
(45) Date of Patent: Aug. 13, 2013

(54) INFORMATION PROCESSING APPARATUS, INFORMATION PROCESSING METHOD, AND PROGRAM

(75) Inventor: Kei Tateno, Tokyo (JP)

(73) Assignee: Sony Corporation (JP)

( * ) Notice: Subject to any disclaimer, the term of this patent is extended or adjusted under 35 U.S.C. 154(b) by 331 days.

(21) Appl. No.: 12/932,855

(22) Filed: Mar. 8, 2011

(65) Prior Publication Data

US 2011/0238605 A1   Sep. 29, 2011

(30) Foreign Application Priority Data

Mar. 25, 2010   (JP) ................................ P2010-070493

(51) Int. Cl.
  *G06F 15/18*   (2006.01)
(52) U.S. Cl.
  USPC ............................................................ 706/12
(58) Field of Classification Search
  USPC ............................................................ 706/12
  See application file for complete search history.

(56) References Cited

U.S. PATENT DOCUMENTS

| 7,483,864 B2 | 1/2009 | Osoda et al. | |
| 2004/0019584 A1 * | 1/2004 | Greening et al. | 707/1 |
| 2004/0153389 A1 * | 8/2004 | Lortscher, Jr. | 705/36 |

FOREIGN PATENT DOCUMENTS

JP   2009-104632 A   5/2009

OTHER PUBLICATIONS

Chidlovskii, Boris et al "Collaborative Re-Ranking of Search REsults" AAAI 2000 [Online] Downloaded Mar. 18, 2013 http://www.aaai.org/Papers/Workshops/2000/WS-00-01/WS00-01-004.pdf.*
Delgado, Joaquin et al "Content-Based Collaborative Information Filtering" Cooperative Information Agents II Learning, MObility and Electronic Commerce for Information Discovery on the INTernet 1998 [Online] Downloaded Mar. 18, 2013 http://link.springer.com/chapter/10.1007%2FBFb0053686?LI=true#.*
Li, Eldon "Perceived Importance of information system success factors: A meta analysis of group differences" Information and Management 32 1997 [Online] Downloaded Mar. 18, 2013 http://www.sciencedirect.com/science/article/pii/S0378720697000050.*
Ben Hachey et al., "Investigating the Effects of Selective Sampling on the Annotation Task", Proceedings of the Ninth Conference on Computational Natural Language Learning, University of Michigan, USA, Jun. 2005, pp. 144-151.
Thorsten Joachims, "Test Categorization with Support Vector Machines: Learning with Many Relevant Features", Machine Learning: ECML-98, Springer Berlin / Heidelberg, 1998, vol. 1398/1998, pp. 137-142.

(Continued)

*Primary Examiner* — Ben Rifkin
(74) *Attorney, Agent, or Firm* — Lerner, David, Littenberg, Krumholz & Mentlik, LLP

(57) ABSTRACT

An information processing apparatus including: a label acquisition section that acquires a label assigned by a user to a content selected among plural contents; a user certainty factor setting section that sets a user certainty factor to the label assigned by the user; a label prediction learning section that performs label prediction learning; a label prediction section that predicts a label regarding a content to which the label is not assigned, and calculates a label certainty factor that refers to certainty of the predicted label; a user certainty factor prediction section that performs user certainty factor prediction learning, and predicts a user certainty factor of (regarding) the predicted label of (regarding) the content to which the label is not assigned; and a selection section that selects a content to be next assigned a label among contents to which labels are not assigned.

8 Claims, 7 Drawing Sheets

(56) References Cited

OTHER PUBLICATIONS

Michael E. Tipping, "The Relevance Vector Machine", NIPS, 2000, pp. 652-658.

Robert M. Bell et al, "Scalable Collaborative Filtering with Jointly Derived Neighborhood Interpolation Weights", Proceedings of the 2007 Seventh IEEE International Conference on Data Mining, ICDM, 2007, pp. 43-52.

Paul Resnick et al, "Group Lens: An Open Architecture for Collaborative Filtering of Netnews", Proceedings of the 1994 ACM Conference on Computer Supported Cooperative Work, 1994, pp. 175-186.

* cited by examiner

FIG. 3

| CONTENT | CHARACTERISTICS VALUE 1 | CHARACTERISTICS VALUE 2 | CHARACTERISTICS VALUE 3 |
|---|---|---|---|
| C1 | 15 | 25 | 20 |
| C2 | 65 | 70 | 55 |
| C3 | 45 | 50 | 15 |
| C4 | 20 | 25 | 35 |
| C5 | 80 | 75 | 40 |
| C6 | 50 | 40 | 50 |
| . . . | . . . | . . . | . . . |

FIG. 4

| CONTENT | CORRECT LABEL | USER CERTAINTY FACTOR |
|---|---|---|
| C1 | 1 | 0.2 |
| C2 | 0 | 0.8 |

FIG. 5

| CONTENT | PREDICTED LABEL | LABEL CERTAINTY FACTOR | PREDICTED USER CERTAINTY FACTOR | SAMPLE SELECTION SCORE |
|---|---|---|---|---|
| C3 | 1 | 0.2 | 0.1 | 0.5 |
| C4 | 1 | 0.8 | 0.5 | 0.625 |
| C5 | 0 | 0.9 | 0.75 | 0.833 |
| C6 | 0 | 0.15 | 0.8 | 5.333 |
| ... | ... | ... | ... | ... | though title US 8,510,235 B2

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2010-070493 filed in the Japanese Patent Office on Mar. 25, 2010, the entire content of which is incorporated herein by reference.

BACKGROUND OF THE INVENTION

1. Field of the Invention

The present invention relates to information processing apparatuses, information processing methods, and programs. More particularly it relates to an information processing apparatus, an information processing method and a program that are suitable for predicting labels of contents in active learning.

2. Description of the Related Art

In the related art, active learning has been employed in order to predict a label (document category, for example) of a content (document, for example) (See, for example, Japanese Unexamined Patent Application Publication No. 2009-104632).

In existing active learning, a content having a low certainty factor regarding a label predicted by a system is selected as a sample, and a user (a person who assigns a label) assigns the content a label (which will be also called a correct label hereinafter), which leads to an efficient prediction performance achieved with the use of a small number of samples.

SUMMARY OF THE INVENTION

However, in the case where contents have labels with low certainty factors, that is, in the case where it is difficult for a system to predict the labels of the contents, a user often finds it difficult to assign suitable labels to the contents. For example, in the case where the user assigns his/her impressions of the contents, which the user gets respectively from music data, to the contents (music data) as the labels of the contents, there is a possibility that, owing to inconsistency in the user's judgment, similar pieces of music are assigned different labels or not-so-similar pieces of music are assigned similar labels. In another case, there is a possibility that a variation among label values that plural users assign becomes large because impressions the plural users get from the same content are quite different from each other. As a result, certainty factors of correct labels the users assign become low, and in some cases, it may be difficult to properly perform learning in which the system predicts labels of contents. (See, for example, Ben Hachey et al., "Investigating the Effects of Selective Sampling on the Annotation Task", Proceedings of the Ninth Conference on Computational Natural Language Learning, University of Michigan, USA, June 2005, pp. 144-151). As a result, the prediction accuracies of the labels become lower.

The present invention is achieved with the above-described problems borne in mind, and increases the prediction accuracy of labels of contents through active learning.

An information processing apparatus according to an embodiment of the present invention includes: a label acquisition section configured to acquire a label assigned by a user to a content selected among plural contents; a user certainty factor setting section configured to set a user certainty factor that refers to a certainty of the label assigned by the user; a label prediction learning section configured to perform label prediction learning to predict the label on the basis of characteristics values of the content to which the label is assigned and the label; a label prediction section configured to predict a label regarding a content to which the label is not assigned on the basis of the results of the label prediction learning and the characteristics values of the content, and configured to calculate a label certainty factor that refers to a certainty of the predicted label; a user certainty factor prediction section configured to perform user certainty factor prediction learning to predict the user certainty factor on the basis of the characteristics values of the content to which the label is assigned and the user certainty factor, and configured to predict a user certainty factor of the predicted label regarding the content to which the label is not assigned on the basis of the results of the user certainty factor prediction learning and the characteristics values of the content; and a selection section configured to select a content to be next assigned a label among contents to which labels are not assigned.

In the user certainty factor setting section, the user certainty factor can be set on the basis of at least one out of a necessary amount of time the user spends and the number of label changes made by the user until the user decides upon the label to be assigned to the content.

In the user certainty factor setting section, the user certainty factor can be set on the basis of a variation among the label values plural users assign.

In the selection section, a content to be next assigned the label can be selected on the basis of the idea that, the lower the label certainty factor and the higher the user certainty factor regarding the predicted label of a content are, the higher a priority assigned to the content is.

In the selection section, if the label is a rating of a content, a content to be next assigned the label can be selected on the basis of the idea that, the higher the predicted rating value of the predicted label of a content is, the higher another priority newly assigned to the content is.

In the selection section, a content to be next assigned the label can be selected on the basis of the idea that another priority is newly assigned to a content that has been used by the user in the past.

An information processing method according to an embodiment of the present invention includes the steps of: acquiring a label assigned by a user to a content selected among plural contents; setting a user certainty factor that refers to the certainty of the label assigned by the user; performing label prediction learning to predict the label on the basis of characteristics values of the content to which the label is assigned and the label; predicting a label regarding a content to which the label is not assigned on the basis of the results of the label prediction learning and the characteristics values of the content; calculating a label certainty factor that refers to a certainty of the predicted label; performing user certainty factor prediction learning to predict the user certainty factor on the basis of the characteristics values of the content to which the label is assigned and the user certainty factor; predicting a user certainty factor of the predicted label regarding the content to which the label is not assigned on the basis of the results of the user certainty factor prediction learning and the characteristics values of the content, and selecting a content to be next assigned a label among contents to which labels are not assigned.

A program according to an embodiment of the present invention causes a computer to execute processing including the steps of: acquiring a label assigned by a user to a content selected among plural contents; setting a user certainty factor that refers to a certainty of the label assigned by the user; performing label prediction learning to predict the label on the basis of characteristics values of the content to which the label is assigned and the label; predicting a label regarding a content to which the label is not assigned on the basis of the results of the label prediction learning and the characteristics values of the content; calculating a label certainty factor that refers to a certainty of the predicted label; performing user certainty factor prediction learning to predict the user certainty factor on the basis of the characteristics values of the content to which the label is assigned and the user certainty factor; predicting a user certainty factor of the predicted label regarding the content to which the label is not assigned on the basis of the results of the user certainty factor prediction learning and the characteristics values of the content, and selecting a content to be next assigned a label among contents to which labels are not assigned.

In an embodiment of the present invention: a label assigned by a user to a content selected among plural contents is acquired; a user certainty factor that refers to a certainty of the label assigned by the user is set; label prediction learning to predict the label is performed on the basis of characteristics values of the content to which the label is assigned and the label; a label regarding a content to which the label is not assigned is predicted on the basis of the results of the label prediction learning and the characteristics values of the content; a label certainty factor that refers to a certainty of the predicted label is calculated; user certainty factor prediction learning to predict the user certainty factor is performed on the basis of the characteristics values of the content to which the label is assigned and the user certainty factor; a user certainty factor of the predicted label regarding the content to which the label is not assigned is predicted on the basis of the results of the user certainty factor prediction learning and the characteristics values of the content; and a content to be next assigned a label is selected among contents to which labels are not assigned.

According to an embodiment of the present invention, it is possible to predict a label of a content. In particular, according to an embodiment of the present invention, it is possible to improve the prediction accuracy of labels of contents by employing active learning.

BRIEF DESCRIPTION OF THE DRAWINGS

FIG. 3 is a table showing examples of characteristics values of contents;

FIG. 4 is a table showing examples of correct labels and user certainty factors of contents;

FIG. 5 is a table showing examples of predicted labels, label certainty factors, predicted user certainty factors and sample selection scores;

DESCRIPTION OF THE PREFERRED EMBODIMENTS

Embodiments of the present invention (referred to as embodiments hereinafter) will be described below.

Descriptions about the embodiments will be made regarding the following subjects in this order.

1. First embodiment (fundamental configuration)
2. Second embodiment (example applied to a content recommendation process)<

1. First Embodiment

Firstly, a first embodiment of the present invention will be described with reference to FIG. 1 to FIG. 5.
[Configuration Example of Information Processing Apparatus]

Figure 1:
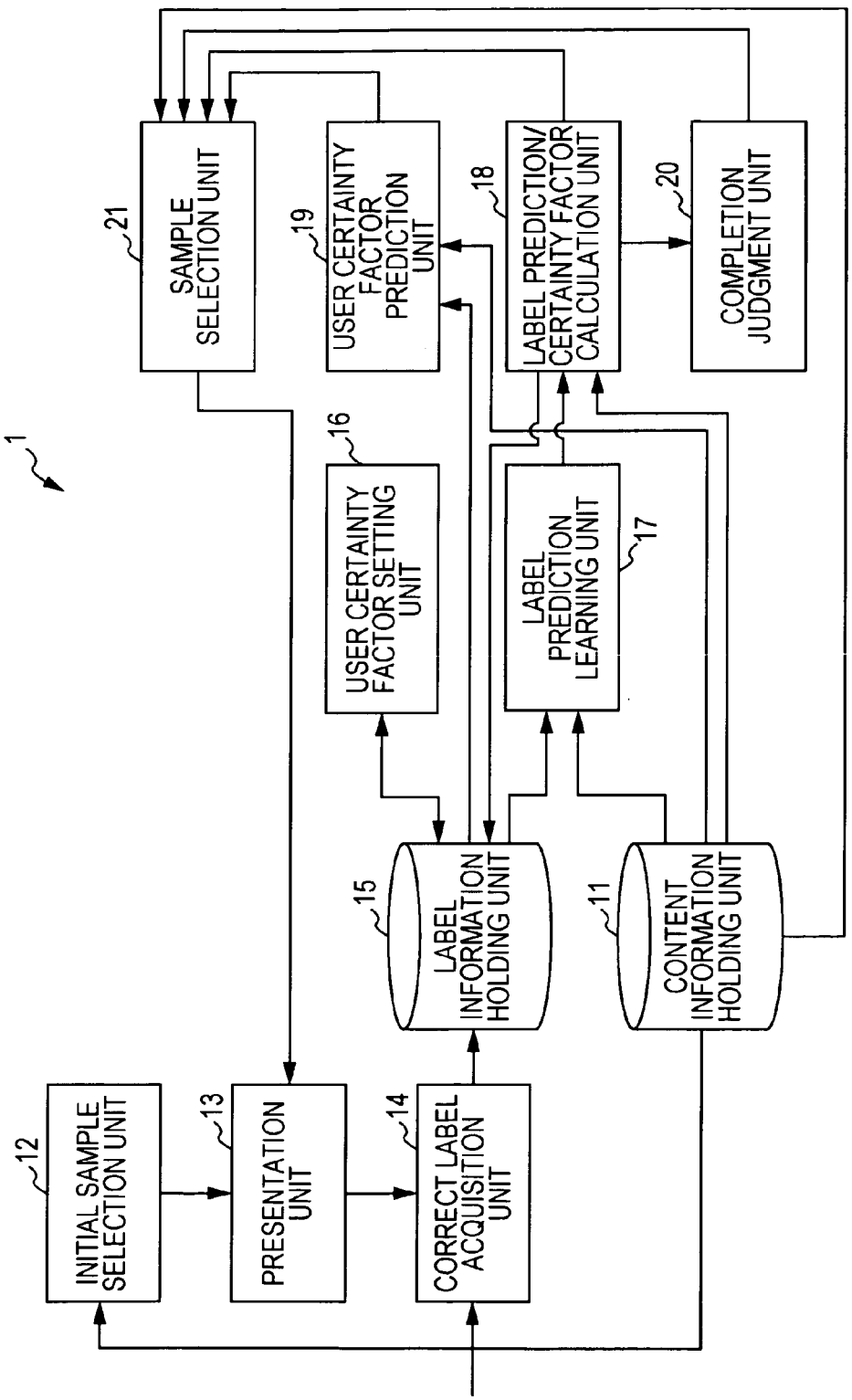
FIG. 1 is a block diagram showing a first configuration example of an information processing apparatus according to an embodiment of the present invention.

FIG. 1 is a block diagram showing a configuration example of an information processing apparatus 1 according to an embodiment of the present invention. The information processing apparatus 1 is an apparatus for predicting a label of a content. Here, a content indicates a piece of image data, a piece of moving image data, a piece of music data, one of a variety of commercial goods, a piece of document data, or the like. A content is not limited to an item belonging to a specific category. In addition, a label is a piece of information that indicates a property of a content, and, for example, is a genre or a category to which the content belongs, a user's subjective impression of the content (for example, interesting, sad, or the like), or a ranking value indicating the user's subjective impression.

The information processing apparatus 1 includes a content information holding unit 11, an initial sample selection unit 12, a presentation unit 13, a correct label acquisition unit 14, a label information holding unit 15, a user certainty factor setting unit 16, a label prediction learning unit 17, a label prediction/certainty factor calculation unit 18, a user certainty factor prediction unit 19, a completion judgment unit 20, and a sample selection unit 21.

The content information holding unit 11 stores a various pieces of information regarding plural contents (for example, names, types, properties, and the like). In addition, some or all pieces of information regarding contents are used as characteristics values in label prediction, which will be described later. For example, the characteristics values include keywords that indicate genres to which contents belong or characteristics of contents. In addition, if contents, such as image data and music data, are indicated by a variety of signals (for example, image signals, music signals, and the like), it is possible to use these signals as characteristics values.

In the case where contents are some type of contents that can be held in the content information holding unit 11, the contents themselves along with information regarding the contents may be held in the content information holding unit 11.

The initial sample selection unit 12 selects a content as an initial sample among contents held in the content information holding unit 11. The initial sample is a target content to be initially assigned a correct label by a user. The initial sample selection unit 12 acquires information regarding the selected initial sample from the content information holding unit 11, and provides the presentation unit 13 with the information.

The presentation unit 13 presents the user with the information regarding the initial sample selected by the initial sample selection unit 12 and information regarding a sample selected by the sample selection unit 21. In addition, the presentation unit 13 provides the correct label acquisition unit 14 with the information regarding the sample presented to the user.

The correct label acquisition unit 14 acquires a correct label assigned by the user to the sample presented by the presentation unit 13 via an input device (not shown). In addition, the correct label acquisition unit 14 acquires information regarding the user's conduct performed when the user assigns a correct label to each sample, wherein the information is referred to as the user conduct information hereinafter. The correct label acquisition unit 14 causes the label information holding unit 15 to hold the acquired correct label and user conduct information in association with the corresponding content (sample).

The user certainty factor setting unit 16 acquires the correct label and the user conduct information regarding each sample to which the correct label is assigned from the label information holding unit 15. Subsequently, the user certainty factor setting unit 16 sets a user certainty factor that refers to certainty of the correct label to the correct label assigned to each sample by the user. The user certainty factor setting unit 16 causes the label information holding unit 15 to hold the set user certainty factor in association with the corresponding content (sample).

A user certainty factor regarding a correct label of a content (sample) may be hereinafter also referred to as the user certainty factor of the content for short.

The label prediction learning unit 17 acquires characteristics values of contents, to which correct labels have been already assigned, from the content information holding unit 11, (wherein the contents are referred to as already-rated contents hereinafter,) and acquires the correct labels of the already-rated contents from the label information holding unit 15. Subsequently, the label prediction learning unit 17 performs learning for predicting the label of each content with the use of a prescribed method on the basis of the characteristics values and correct labels of the already-rated contents. The label prediction learning unit 17 provides the label prediction/certainty factor calculation unit 18 with the results of the label prediction learning.

The label prediction/certainty factor calculation unit 18 acquires characteristics values of contents, which are not assigned correct labels, from the content information holding unit 11, wherein the contents are referred to as the non-rated contents hereinafter. Subsequently, the label prediction/certainty factor calculation unit 18 predicts the label of each non-rated content on the basis of the results of the label prediction learning performed by the label prediction learning unit 17 and the characteristics values of each non-rated content. In addition, the label prediction/certainty factor calculation unit 18 calculates a label certainty factor that refers to a certainty of the label that is predicted (referred to as the predicted label hereinafter). The label prediction/certainty factor calculation unit 18 causes the label information holding unit 15 to hold the predicted label in association with the corresponding content. In addition, the label prediction/certainty factor calculation unit 18 provides the completion judgment unit 20 with the predicted label and the label certainty factor regarding each non-rated content. In addition, the label prediction/certainty factor calculation unit 18 provides the sample selection unit 21 with the label certainty factor regarding the predicted label of each non-rated content.

A label certainty factor regarding a predicted label of a certain content may be also referred to as the label certainty factor of the content for short hereinafter.

The user certainty factor prediction unit 19 acquires the characteristics values of each already-rated content from the content information holding unit 11, and also acquires the user certainty factor of each already-rated content from the label information holding unit 15. Subsequently, the user certainty factor prediction unit 19 performs learning for predicting a user certainty factor with the use of a prescribed method on the basis of the user certainty factor and the characteristics values of each already-rated content. In addition, the user certainty prediction unit 19 acquires the characteristics values of each non-rated content from the content information holding unit 11. Subsequently, the user certainty factor prediction unit 19 predicts a user certainty factor regarding the predicted label of each non-rated content on the basis of the results of the user certainty factor prediction learning and the characteristics values of each non-rated content. The user certainty factor prediction unit 19 provides the sample selection unit 21 with the user certainty factor regarding the predicted label of each non-rated content (referred to as the predicted user certainty factor hereinafter). Here, the predicted user certainty factor is a predicted value that refers to how accurately a user can assign a label to each non-rated content.

A predicted user certainty factor regarding a predicted label of a content is hereinafter referred to as the predicted user certainty factor of the content for short.

The completion judgment unit 20 judges whether the completion condition of the label prediction process is met or not, and informs the sample selection unit 21 of the judgment result.

The sample selection unit 21 selects a sample out of the non-rated contents on the basis of the label certainty factors and the predicted user certainty factors. The sample selection unit 21 acquires information regarding the selected sample from the content information holding unit 11, and provides the presentation unit 13 with the information.

[Label Prediction Process]

Next, a label prediction process performed by the information processing apparatus 1 will be described with reference to the flow chart shown in FIG. 2.

Here, it will be assumed that information regarding contents including contents C1 to C6 is stored in the content information holding unit 11 as shown in FIG. 3 hereinafter. In addition, it will be assumed that information regarding each content has three types of characteristics values, that is, a characteristic amount 1 to a characteristic amount 3. For the sake of simplicity, descriptions regarding contents other than contents C1 to C6 will be omitted hereinafter.

At step S1, the initial sample selection unit 12 selects a content (contents) as an initial sample (samples) among contents held in the content information holding unit 11. In this selection of the initial sample, the initial sample selection unit 12 can randomly select the initial sample(s), or can select so that the characteristics values of the initial samples may disperse. In addition, the number of the selected initial sample(s) can be set arbitrary. The initial sample selection unit 12 acquires information regarding the selected initial sample(s) from the content information holding unit 11, and provides the presentation unit 13 with the information.

In the following descriptions, it will be assumed that the contents C1 and C2 are selected as initial samples among the contents shown in FIG. 3.

At step S2, the presentation unit 13 presents a user with the samples. The method to present the user with the samples is not limited to a specific method, and can be an arbitrary method. For example, if the contents are image data, the presentation unit 13 presents the user with the samples by displaying images or thumbnail images on a display. In addition, if the contents are music data, the presentation unit 13 presents the user with the samples by actually outputting sounds out of speakers or by displaying the titles of the pieces of music or the names of musical performers on a display. The presentation unit 13 provides the correct label acquisition unit 14 with information regarding the presented samples.

At step S3, the correct label acquisition unit 14 acquires correct labels. For example, the user inputs the correct labels to be assigned to the samples presented by the presentation unit 13 via an input device (not shown). The correct label acquisition unit 14 acquires the correct labels input by the user.

In addition, the correct label acquisition unit 14 acquires user conduct information regarding the user's conduct performed when the user assigns the correct labels. For example, the correct label acquisition unit 14 acquires a necessary time the user spends and the number of alternations of the label made by the user until the user decides the correct label to be assigned to each sample as the user conduct information. The correct label acquisition unit 14 causes the label information holding unit 15 to hold the acquired correct labels and user conduct information in association with the corresponding contents (samples) respectively. Here, one user can assign the labels to the contents, or plural users can assign the labels to the contents.

In this instance, it will be assumed that correct labels, which have values 1 and 0, are respectively assigned to the contents C1 and C2 as shown in FIG. 4 by one user.

At step S4, the user certainty factor setting unit 16 sets user certainty factors. To put it concretely, at step S3, the user certainty factor setting unit 16 acquires the correct labels and user conduct information regarding the samples that are newly assigned the correct labels from the label information holding unit 15 at step S3. Next, in the case where one user assigns the labels to the samples, the user certainty factor setting unit 16 sets a higher user certainty factor if the amount of time the user spends until deciding upon the correct label to be assigned to each sample is shorter, and sets a lower user certainty factor if the amount of time the user spends until deciding upon the correct label to be assigned to each sample is longer. On the other hand, in the case where plural users assign labels to the samples, a user certainty factor can be set on the basis of the average amount of time or the total amount of time.

Alternatively, in the case where one user assigns the labels to the samples, the user certainty factor setting unit 16 sets a higher user certainty factor if the number of label changes made by the user until deciding upon the label to be assigned to each sample is smaller, and sets a lower user certainty factor if the number of label changes made by the user until deciding upon the label to be assigned to each sample is larger. On the other hand, in the case where plural users assign the labels to the contents, a user certainty factor can be set on the basis of the average number of label changes or the total number of label changes.

Alternatively, in the case where plural users assign the labels to the samples, the user certainty factor setting unit 16 sets a higher user certainty factor to a correct label of each sample if a variation (for example, a variance) among correct label values assigned to each sample by the plural users is smaller, and sets a lower user certainty factor to the correct label of each sample if the variation is larger.

Subsequently, the user certainty factor setting unit 16 causes the label information holding unit 15 to hold the set user certainty factors in association with the corresponding contents (samples).

In the case where the user certainty is set by using the amount of time necessary to decide upon the correct label, the number of label changes, or the variation among the correct label values as an index as described above, the user certainty factor can be calculated with the use of a function that makes the user certainty factor become larger if the index becomes smaller (for example, the reciprocal of the index).

The above-described method is one of examples of calculation methods of the user certainty factor, and an index other than the above indexes can alternatively be used for the calculation.

In addition, a combination of plural indexes (for example, the amount of time necessary to decide upon the correct label and the number of label changes) can alternatively be used for calculation of the user certainty factor.

Alternatively, instead of calculation of a user certainty factor by the user certainty factor setting unit 16, the user can directly assign the user certainty factor. For example, it is possible that, after evaluating the user certainty factor regarding a label assigned to a sample with the use of five rating levels, the user inputs the decided user certainty factor via an input device (not shown). After acquiring the user certainty factor input by the user, the user certainty factor setting unit 16 causes the label information holding unit 15 to hold the user certainty factor in association with the corresponding content (sample).

In this way, the user certainty factor, which indicates how accurate a correct label of each content (sample) is, that is, how reliable the correct label is, is set for the correct label of each content (sample).

In the following descriptions, it will be assumed that the user certainty factors regarding the correct labels of the contents C1 and C2 are set 0.2 and 0.8 respectively as shown in FIG. 4.

At step S5, the label prediction learning unit 17 performs label prediction learning. To put it concretely, the label prediction learning unit 17 acquires the characteristics values of each already-rated content from the content information holding unit 11, and the correct label of each already-rated content from the label information holding unit 15. Here, the already-rated contents that are targets of this label prediction learning include the samples that are newly assigned the correct labels at step S3. Subsequently, the label prediction learning unit 17 performs learning for predicting a label of each already-rated content with the use of a prescribed method on the basis of the characteristics values and correct label of each already-rated content. The label prediction learning unit 17 provides the label prediction/certainty factor calculation unit 18 with the results of the label prediction learning.

Here, the method used for the label prediction learning is not limited to a specific method, and a general machine learning method can be employed. For example, if the label of a learning target has a discrete or name-attributive nature, such as a genre to which a content belongs, classification learning methods such as the SVM (Support Vector Machine) method, the Logistic Regression method, or the like can be employed. On the other hand, if the label of a learning target has a continuous or ordinal scale nature, such as a label that indicates the degree of interest factor with the use of five levels from 1 to 5, classification learning methods such as the Linear Regression method, the RVR (Relevance Vector Regression) method, or the like can be employed.

The details of SVM are described, for example, in "Thorsten Joachims, "Text Categorization with Support Vector Machines: Learning with Many Relevant Features", Machine Learning: ECML-98, Springer Berlin/Heidelberg, 1998, Volume 1398/1998, pp. 137-142". The details of SVM are described, for example, in "Michael E. Tipping, "The Relevance Vector Machine", NIPS, 2000".

At step S6, the label prediction/certainty factor calculation unit 18 predicts labels of contents, and calculates the certainty factors of the predicted labels. To put it concretely, the label prediction/certainty factor calculation unit 18 acquires the characteristics values of non-rated contents that are not assigned correct labels from the content information holding unit 11. Subsequently, the label prediction/certainty factor calculation unit 18 predicts a label of each non-rated content on the basis of the results of the label prediction learning performed by the label prediction learning unit 17 and the characteristics values of each non-rated content.

In addition, the label prediction/certainty factor calculation unit 18 calculates a label certainty factor regarding the predicted label of each non-rated content. For example, there is a case where a value corresponding to a certainty factor regarding the predicted label is calculated depending on a method employed in the label prediction. In this case, the label prediction/certainty factor calculation unit 18 sets the value to the label certainty factor. For example, in Linear Regression or RVR methods, a posterior probability calculated for the predicted label can be set to a label certainty factor. In addition, in the SVM method, a distance to each label from the discrimination plane can be set to a label certainty factor of each label.

In this way, the label of each content is predicted, and the user certainty factor, which indicates how accurate the predicted label is, that is, how reliable the predicted label is, is calculated.

The label prediction/certainty factor calculation unit 18 causes the label information holding unit 15 to hold the predicted label of each non-rated content in association with the corresponding content. In addition, the label prediction/certainty factor calculation unit 18 provides the completion judgment unit 20 with the predicted label and the label certainty factor of each non-rated content. In addition, the label prediction/certainty factor calculation unit 18 provides the sample selection unit 21 with the label certainty factor of each non-rated content.

In the following descriptions, it will be assumed that the labels of non-rated contents C3 to C6 are respectively predicted as 1, 1, 0, and 0, and the label certainty factors are respectively calculated as 0.2, 0.8, 0.9, and 0.15 as shown in FIG. 5.

At step S7, the user certainty factor prediction unit 19 performs user certainty factor prediction learning. To put it concretely, the user certainty factor prediction unit 19 acquires the characteristics values of each already-rated content from the content information holding unit 11, and acquires the user certainty factor of each already-rated content from the label information holding unit 15. Here, the already-rated contents that are targets of this user certainty factor prediction learning include the samples that are newly assigned the correct labels at step S3. Subsequently, the user certainty factor prediction unit 19 performs learning for predicting a user certainty factor with the use of a general machine learning method similar to that used in the label prediction learning on the basis of the user certainty factor and characteristics values of each already-rated content.

At step S8, the user certainty factor prediction unit 19 predicts a user certainty factor. To put it concretely, the user certainty factor prediction unit 19 acquires the characteristics values of each already-rated content from the content information holding unit 11. The user certainty factor prediction unit 19 predicts a user certainty factor regarding the predicted label of each non-rated content on the basis of the results of the user certainty factor prediction learning and the characteristics values of each non-rated content. The user certainty factor prediction unit 19 provides the sample selection unit 21 with the predicted user certainty factor of each non-rated content.

In the following descriptions, it will be assumed that the predicted user certainty factors regarding the contents C3 to C6 are predicted as 0.1, 0.5, 0.75, and 0.8 respectively as shown in FIG. 5.

For a combination of the processes of steps S5 and S6, either one of the two steps can be performed earlier than the other, or both can be performed in parallel. The same holds true for a combination of the processes of steps S7 and S8.

At step S9, the completion judgment unit 20 judges whether the completion condition is met or not. For example, the completion judgment unit 20 judges that the completion condition is met if all the contents are respectively assigned correct labels by the user(s).

On the other hand, in the case where there is at least one content that is not assigned a correct label, the completion judgment unit 20 judges that the completion condition is met if the label certainty factors of all the non-rated contents are equal to or larger than a prescribed threshold, and judges that the completion condition is not met if there is at least one non-rated content with its label certainty factor smaller than the prescribed threshold. Alternatively, the completion judgment unit 20 performs cross validation with the use of the predicted labels of the non-rated contents. Subsequently, the completion judgment unit 20 judges that the completion condition is met if the degree of accuracy obtained from the cross validation is equal to or larger than a prescribed threshold, and judges that the completion condition is not met if the degree of accuracy obtained from the cross validation is smaller than the prescribed threshold.

When the completion condition is not met, the completion judgment unit 20 informs the sample selection unit 21 of the judgment result, and the flow proceeds to step S10.

At step 10, the sample selection unit 21 selects a sample. Although it is conceivable that an item that most improves the prediction accuracy or has the largest parameter variation is used as an index for selection of the sample, the following descriptions will be made for the case where label certainty factors and predicted user certainty factors are used as indexes for selection of the sample.

In the label prediction learning, a correct label of a content that has a lower label certainty factor is more valuable than that of a content that has a higher label certainty factor. This is because, for example, when a classification learning method is used for the label prediction learning, a content that has a lower label certainty factor is located nearer to the discrimination plane, so that if a correct label of a content located nearer to the discrimination plane is acquired, a more accurate discrimination plane can be created. Therefore, in the label prediction learning, it is preferable that a content that has a lower label certainty factor is selected as a sample.

On the other hand, it is preferable for the user that a content with a higher predicted user certainty factor is selected as a sample. This is because, the higher predicted user certainty factor a content has, the more certain it is that the user can assign a label quicker and more accurately, so that the user's psychological and temporal burdens can be relieved.

Therefore, the sample selection unit 21 calculates a sample selection score, which acts as a judgment standard of sample selection, for each non-rated content with the use of a function that monotonically increases with a predicted user certainty factor and monotonically decreases with a label certainty factor. Subsequently, the sample selection unit 21 selects, for example, a prescribed number of non-rated contents in descending order of the sample selection scores of the non-rated contents. Alternatively, the sample selection unit 21 selects, for example, non-rated contents that have their sample selection scores larger than a prescribed threshold as samples. In these ways, samples that have lower label certainty factors and higher predicted user certainty factors regarding their predicted labels are preferentially selected as the samples.

Here, because the correct labels of contents having high label certainty factors are not very important in label prediction learning, non-rated contents that have their label certainty factors larger than a prescribed threshold can be omitted from candidates for the sample selection.

Subsequently, the sample selection unit 21 acquires information regarding the selected sample from the content information holding unit 11, and provides the presentation unit 13 with the information.

FIG. 5 shows an example of sample selection scores obtained from an equation: sample selection score=predicted user certainty factor/label certainty factor. To put it concretely, the sample selection scores of the contents C3 to C6 are respectively 0.5, 0.625, 0.833, 5.333. In the case where one sample is to be selected from the contents C3 to C6, the contents C4 and C5 are omitted from the candidates for the sample because their label certainty factors 0.8 and 0.9 are high. Because the sample selection score of the content C6 is higher than that of the content C3 when they are compared with each other, the content C6 is selected as the sample.

Subsequently, the flow goes back to step S2, and the processes from step S2 to step S10 are repeated until it is judged that the completion condition is met at step S9. As described above, the active learning regarding label prediction of contents is performed, and the label of each content is predicted.

On the other hand, if it is judged that the completion condition is met at step S9, the label prediction process is finished.

In this way, it becomes possible to make the active learning regarding label prediction of contents more quickly converge, and at the same time the accuracy of the learning is improved. As a result, the prediction accuracy regarding the label of each content is improved. In addition, user's psychological and temporal burdens in giving correct labels can be relieved.

2. Second Embodiment

Next, the second embodiment of the present invention will be described with reference to FIG. 6 and FIG. 7. Here, it will be assumed that the second embodiment is applied to a content delivery service in which a user is provided with a variety of contents, and the user uses these contents (for example, views them), and assigns labels to these contents.

In the following descriptions, an example, in which a content is assigned rating information indicating each user's preference as a label, the rating of other contents are predicted on the basis of the assigned rating information, and a content is recommended for the user, will be described. Here, the rating information is assigned, for example, in the form of choice between the two, that is, a like and a dislike, or in the form of five rating levels based on the degree of a like or a dislike.

[Configuration Example of Information Processing Apparatus]

Figure 6:
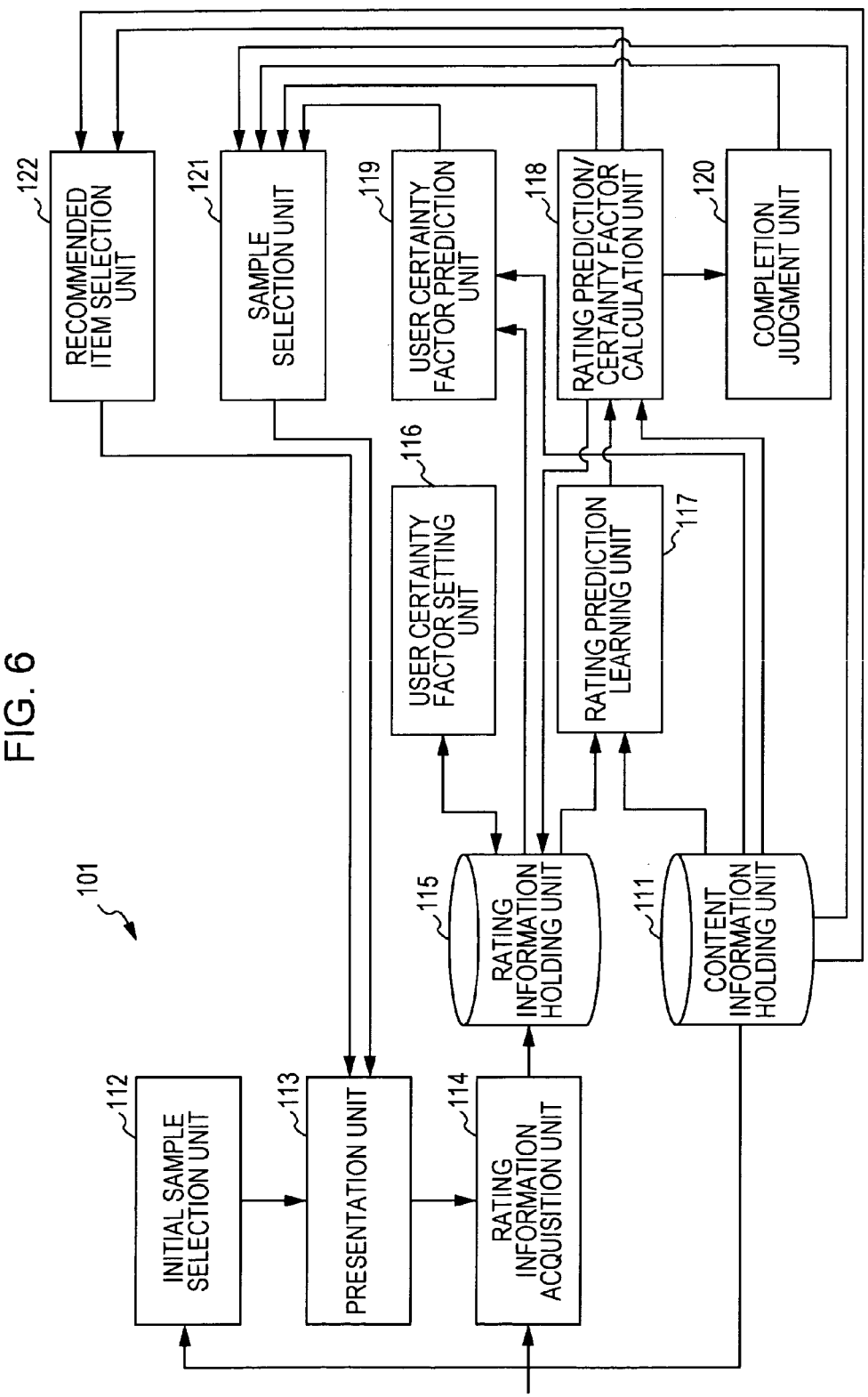
FIG. 6 is a block diagram showing a second configuration example of an information processing apparatus according to an embodiment of the present invention.
Figure 7:
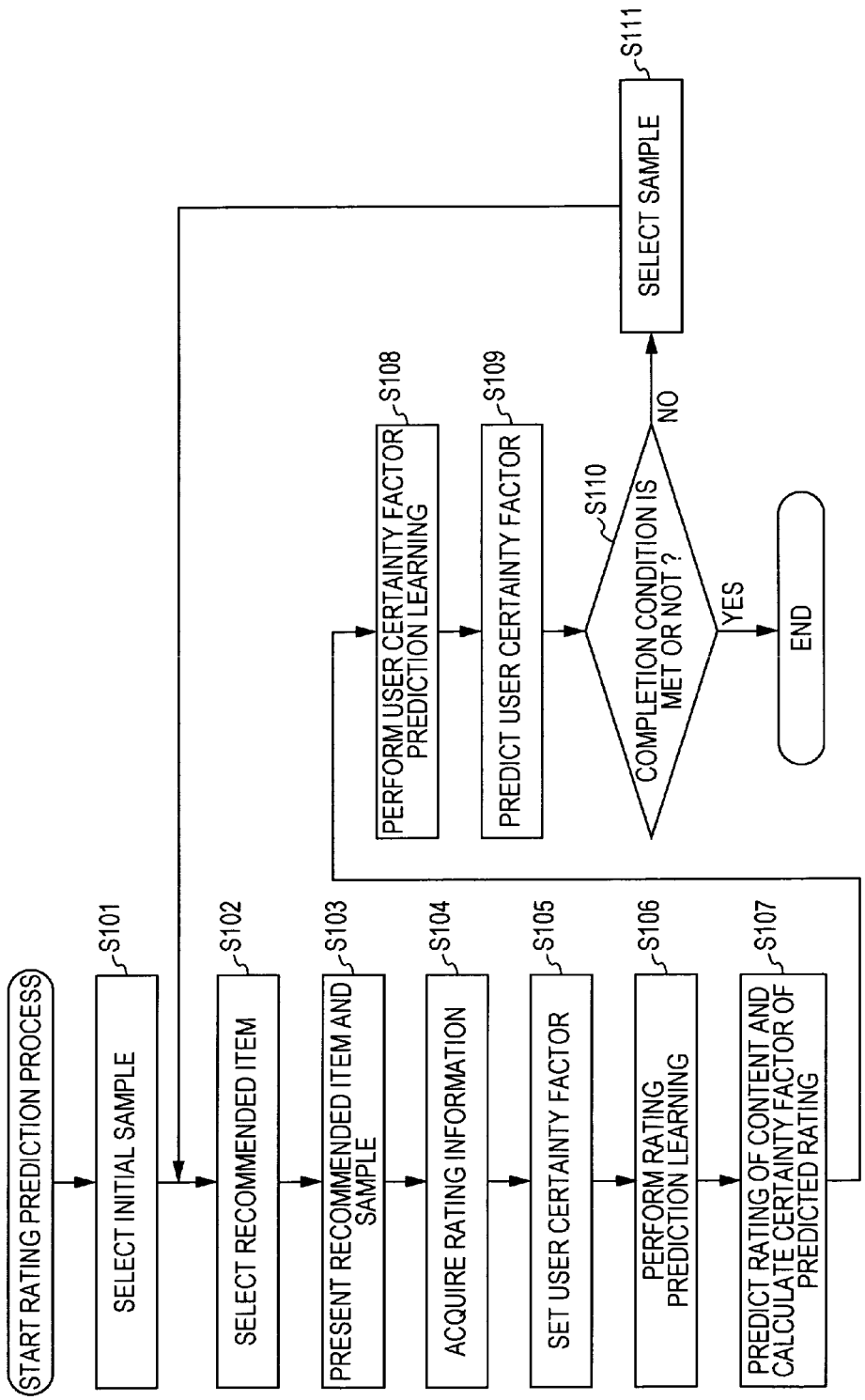
FIG. 7 is a flowchart for explaining a rating prediction process.

FIG. 6 is a block diagram showing a configuration example of an information processing apparatus 101 according to an embodiment of the present invention. The information processing apparatus 101 includes a content information holding unit 111, an initial sample selection unit 112, a presentation unit 113, a rating information acquisition unit 114, a rating information holding unit 115, a user certainty factor setting unit 116, a rating prediction learning unit 117, a rating prediction/certainty factor calculation unit 118, a user certainty factor prediction unit 119, a completion judgment unit 120, a sample selection unit 121, and a recommended item selection unit 122. The units in FIG. 6 corresponding to the units in FIG. 1 are given the same lower 2 digits of reference numerals as those of the units in FIG. 1, and descriptions regarding the processes of the units in FIG. 6 that are the same as those of the units in FIG. 1 will be omitted for avoiding overlap.

The initial sample selection unit 112 selects a content as an initial sample among contents whose information is held in the content information holding unit 111. The initial sample selection unit 112 acquires information regarding the selected initial sample from the content information holding unit 111, and sends the information to the presentation unit 113.

The presentation unit 113 presents a user with the information regarding the initial sample selected by the initial sample selection unit 112, information regarding a sample selected by the sample selection unit 121, and information regarding a recommended item selected by the recommended item selection unit 122. In addition, the presentation unit 113 provides the correct label acquisition unit 114 with the information regarding the contents (the sample and the recommended item) presented to the user.

The rating information acquisition unit 114 acquires rating information assigned by the user to the recommended item and the sample presented by the presentation unit 113 via an input device (not shown). In addition, the rating information acquisition unit 114 acquires information regarding the user's conduct performed when the user assigns rating information to each recommended item and the sample. The rating information acquisition unit 114 causes the rating information holding unit 115 to hold the acquired rating information and user conduct information in association with the corresponding contents (the corresponding recommended item and sample).

The user certainty factor setting unit 116 acquires the rating information and user conduct information regarding the recommended items and samples, to which the rating information is assigned, from the rating information holding unit 115. Subsequently, the user certainty factor setting unit 116 sets user certainty factors regarding the rating information of each recommended item and sample. The user certainty factor setting unit 116 causes the label information holding unit 115 to hold the set user certainty factors in association with the corresponding contents (the corresponding recommended item and sample).

The rating prediction learning unit 117 acquires characteristics values of already-rated contents, to which rating information has been already assigned, from the content information holding unit 111, and acquires the rating information of the already-rated contents from the rating information holding unit 115. Subsequently, the rating prediction learning unit 117 performs learning for predicting rating of each content with the use of a prescribed method on the basis of the characteristics values and rating information of the already-rated contents. The rating prediction learning unit 117 provides the rating prediction/certainty factor calculation unit 118 with the results of the rating prediction learning.

The rating prediction/certainty factor calculation unit 118 acquires characteristics values of non-rated contents that are not assigned rating information from the content information holding unit 111. Subsequently, the rating prediction/certainty factor calculation unit 118 predicts rating of each non-rated content on the basis of the results of the rating prediction learning performed by the rating prediction learning unit 117 and the characteristics values of each non-rated content. In addition, the rating prediction/certainty factor calculation unit 118 calculates a rating certainty factor that refers to a certainty of the rating of each non-rated content that is predicted as described above, wherein the predicted rating predicted as described above is referred to as the predicted rating value hereinafter. The rating prediction/certainty factor calculation unit 118 causes the rating information holding unit 115 to hold the predicted rating value of each non-rated content in association with the corresponding content. In addition, the rating prediction/certainty factor calculation unit 118 provides the completion judgment unit 120 with the predicted rating value and rating certainty factor of each non-rated content. In addition, the rating prediction/certainty factor calculation unit 118 provides the sample selection unit 121 with the rating certainty factor of each non-rated content. In addition, the rating prediction/certainty factor calculation unit 118 provides the recommended item selection unit 122 with the predicted rating value of each non-rated content.

The user certainty factor prediction unit 119 acquires the characteristics values of each already-rated content from the content information holding unit 111, and also acquires the user certainty factor of each already-rated content from the rating information holding unit 115. Subsequently, the user certainty factor prediction unit 119 performs learning for predicting a user certainty factor with the use of a prescribed method on the basis of the user certainty factor and the characteristics values of each already-rated content. In addition, the user certainty factor prediction unit 119 acquires the characteristics values of each non-rated content from the content information holding unit 111. Subsequently, the user certainty factor prediction unit 119 predicts a user certainty factor of each non-rated content on the basis of the results of the user certainty factor prediction learning and the characteristics values of each non-rated content. The user certainty factor prediction unit 119 provides the sample selection unit 121 with the user certainty factor of each non-rated content (predicted user certainty factor).

The completion judgment unit 120 judges whether the completion condition of the rating prediction process is met or not, and informs the sample selection unit 121 of the judgment result.

The sample selection unit 121 selects a sample out of the non-rated contents on the basis of the rating certainty factors and the predicted user certainty factors. The sample selection unit 121 acquires information regarding the selected sample from the content information holding unit 111, and provides the presentation unit 113 with the information.

The recommended item selection unit 122 selects a recommended item that is a content to be recommended to the user with the use of a prescribed recommendation algorithm. The recommended item selection unit 122 acquires information regarding the selected recommended item from the content information holding unit 111, and provides the presentation unit 113 with the information.

[Rating Prediction Process]

Next, a rating prediction process performed by the information processing apparatus 101 will be described with reference to the flowchart shown in FIG. 7.

Figure 2:
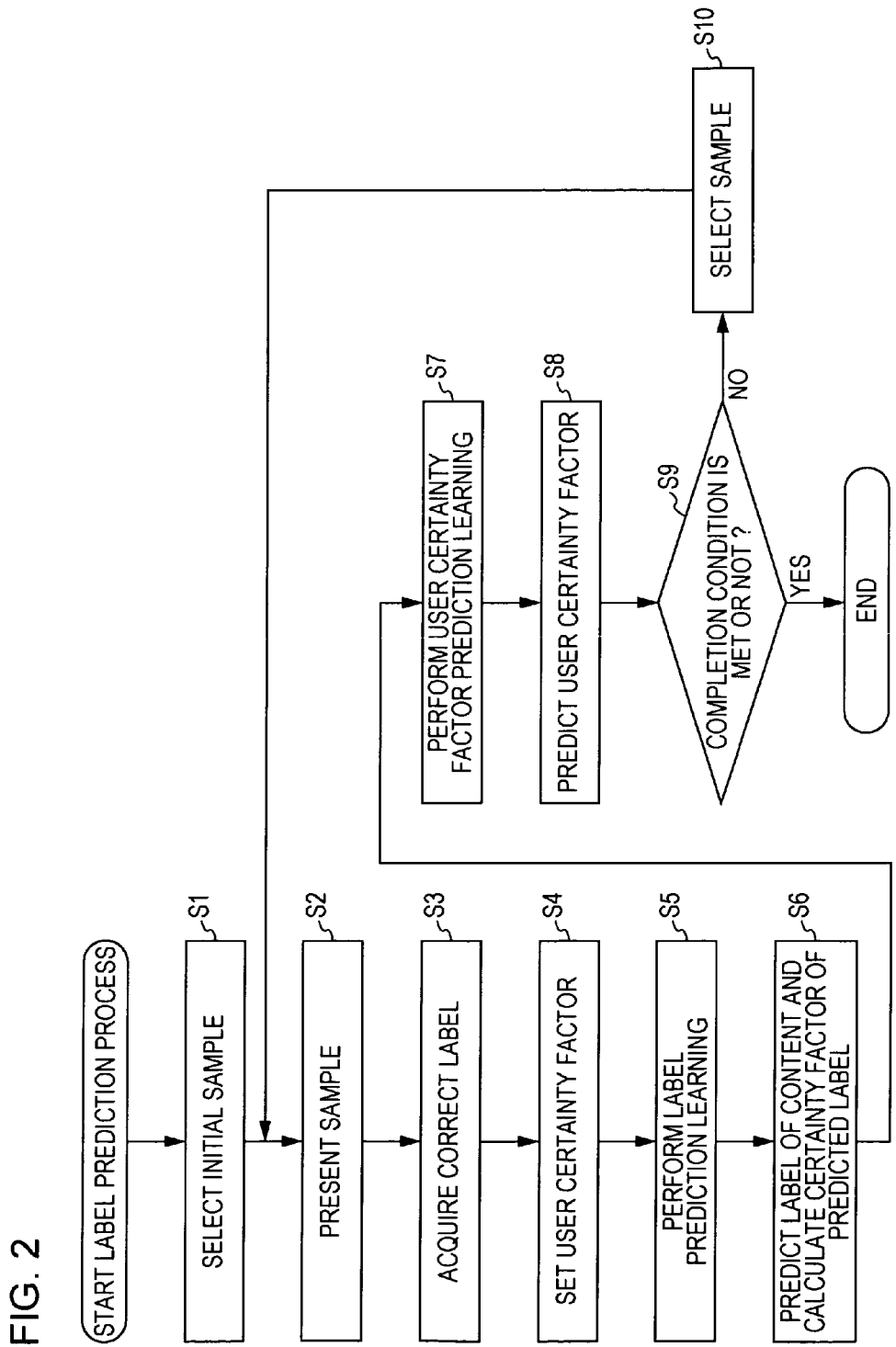
FIG. 2 is a flowchart for explaining a label prediction process.

At step S101, the initial sample selection unit 112 selects an initial sample as is the case with the process of step S1 in FIG. 2. The initial sample selection unit 112 acquires information regarding the selected initial sample from the content information holding unit 111, and provides the presentation unit 113 with the information.

At step S102, the recommended item selection unit 122 selects a recommended item with the use of the prescribed recommendation algorithm. Here, the recommendation algorithm used by the recommended item selection unit 122 is not limited to a specific algorithm, and an arbitrary algorithm can be employed. For example, in the case where there is no content rating history given by the intended user (for example, in the first loop of this process), the recommended item selection unit 122 selects a content that has a high average rating value assigned by another user as a recommended item. In the case where there is a content rating history given by the intended user, the recommended item selection unit 122 selects a content that has a high predicted rating value given by an after-described rating prediction and the like as a recommended item.

At step S103, the presentation unit 113 presents a user with the recommended item and sample.

As is the case with the process of step 2 in FIG. 2, the method to present the user with the recommended item and sample is not limited to a specific method, and can be an arbitrary method.

However, a sample that has an aim to make rating prediction learning more efficient and a recommended item that has a high predicted rating value may not fit together. In this case, if a sample is presented independently of the recommendation list of recommended items, it is expected that there is a possibility that the user does not assign rating information to the sample. Therefore, it is preferable that, for example, by inserting only one sample in the lowest row of the recommendation list, a recommended item and the sample are presented so that the sample is naturally assigned rating information.

Subsequently, the presentation unit 13 provides the rating information acquisition unit 114 with information regarding the presented recommended item and sample.

At step S104, the rating information acquisition unit 114 acquires rating information. For example, the user inputs the rating information to be assigned to the recommended item and sample presented by the presentation unit 113 via an input device (not shown). The rating information acquisition unit 114 acquires the rating information input by the user.

In addition, the rating acquisition unit 114 acquires user conduct information regarding the user's conduct performed when the user assigns the rating information to each recommended item and sample. For example, the rating information acquisition unit 114 acquires a necessary time the user spends and the number of alternations of the rating made by the user until the user decides the rating to be assigned to each recommended item and sample as user conduct information. The rating information acquisition unit 114 causes the rating information holding unit 115 to hold the acquired rating information and user conduct information in association with the corresponding contents (recommended item and sample).

In this case, however, the presented recommended item and sample may not be assigned rating information, which is different from the case of the first embodiment.

At step S105, the user certainty factor setting unit 116 sets user certainty factors regarding the rating information assigned to the recommended item and sample as is the case with the process of step S4 in FIG. 2. Subsequently, the user certainty factor setting unit 16 causes the rating information holding unit 115 to hold the set user certainty factors in association with the corresponding contents (the corresponding recommended item and sample).

At step S106, the rating prediction learning unit 117 performs rating prediction learning. To put it concretely, the rating prediction learning unit 117 acquires the characteristics values of each already-rated content from the content information holding unit 111, and the rating information of each already-rated content from the rating information holding unit 115. Here, the already-rated contents that are targets of this rating prediction learning include the recommended item and sample that are newly assigned the rating information at step S104. Subsequently, the rating prediction learning unit 117 performs learning for predicting rating of each already-rated content with the use of a prescribed method on the basis of the characteristics values and rating information of each already-rated content. The rating prediction learning unit 117 provides the rating prediction/certainty factor calculation unit 118 with the results of the rating prediction learning.

Here, the method used for the rating prediction learning is not limited to a specific method, and as is the case with the label prediction learning of the first embodiment, a general machine learning method in which the relationship between property amounts and a label is learned, a collaborative filtering method, and the like can be employed.

The details of collaborative filtering are described, for example, in "Robert M. Bell et. al., "Scalable Collaborative Filtering with Jointly Derived Neighborhood Interpolation Weights", Proceedings of the 2007 Seventh IEEE International Conference on Data Mining, ICDM, 2007, pp. 43-52", and "P. Resnick et. al., "GroupLens: An Open Architecture for Collaborative Filtering of Netnews", Proceedings of the 1994 ACM conference on Computer supported cooperative work table of contents, Computer Supported Cooperative Work, 1994, pp. 175-186".

At step S107, the rating prediction/certainty factor calculation unit 118 predicts ratings of contents, and calculates the certainty factors of the predicted ratings. To put it concretely, the rating prediction/certainty factor calculation unit 118 acquires the property amounts of a non-rated content from the content information holding unit 111. Subsequently, the rating prediction/certainty factor calculation unit 118 predicts a rating of each non-rated content on the basis of the results of the rating prediction learning performed by the rating prediction learning unit 117 and the property amounts of each non-rated content.

In addition, the rating prediction/certainty factor calculation unit 118 calculates a rating certainty factor regarding the predicted rating of each non-rated content. For example, if a method used for the rating prediction is similar to that used for the label prediction of the first embodiment, the rating prediction factor can be calculated as is the case with the process of step S6 in FIG. 2.

In the case where the collaborative filtering method is used for the rating prediction, a predicted rating value rpui that will be assigned by a user u to an item i is calculated, for example, with the use of a weighted average that is given as a function of a degree of similarity between users suv by the next equation (1). This is described in the above-mentioned non-patent document, "Robert M. Bell et. al., "Scalable Collaborative Filtering with Jointly Derived Neighborhood Interpolation Weights", Proceedings of the 2007 Seventh IEEE International Conference on Data Mining, ICDM, 2007, pp. 43-52".

[Equation 1]

$$rp_{ui} = ra_u + \frac{\sum_v s_{uv}(r_{vi} - ra_v)}{\sum_v s_{uv}} \quad (1)$$

where rau is an average value of ratings that have been assigned by the user u.

In this case, the value corresponding to the rating certainty factor is not definitely obtained. Particularly it is difficult to predict the rating if the numerator suv (rvi–rav) or (rvi–rav) at the right-hand side of the equation (1) varies (its variance is large). In this case, it becomes possible to set, for example, the reciprocal of the variance to the rating certainty factor.

The rating prediction/certainty factor calculation unit 118 causes the rating information holding unit 115 to hold the predicted rating value of each non-rated content in association with the corresponding content. In addition, the rating prediction/certainty factor calculation unit 118 provides the completion judgment unit 120 with the predicted rating value and the rating certainty factor of each non-rated content. In addition, the rating prediction/certainty factor calculation unit 118 provides the sample selection unit 121 with the rating certainty factor of each non-rated content. In addition, the rating prediction/certainty factor calculation unit 118 provides the recommended item selection unit 122 with the predicted rating value of each non-rated content.

At step S108, the user certainty factor prediction unit 119 performs user certainty factor prediction learning. To put it concretely, the user certainty factor prediction unit 119 acquires the property amounts of each already-rated content from the content information holding unit 111, and acquires the user certainty factor of each already-rated content from the rating information holding unit 115. Here, the already-rated contents that are targets of this user certainty factor prediction learning include the recommended item and sample that are newly assigned the rating information at step S104. Subsequently, the user certainty factor prediction unit 119 performs learning for predicting a user certainty factor with the use of a method similar to that used in the rating prediction learning on the basis of the user certainty factor and property amounts of each already-rated content.

At step S109, the user certainty factor prediction unit 119 predicts a user certainty factor regarding the predicted rating value of each non-rated content as is the case with the process of step S8 in FIG. 2. The user certainty factor prediction unit 119 provides the completion judgment unit 120 and the sample selection unit 121 with the predicted user certainty factor of each non-rated content.

At step S110, the completion judgment unit 120 judges whether the completion condition is met or not as is the case with the process of step S9 in FIG. 2. When the completion condition is not met, the flow proceeds to step S111.

At step S111, the sample selection unit 121 selects a sample out of the non-rated contents. Here, as is the case with the process of step S10 in FIG. 2, a content that has a lower rating certainty factor and a higher predicted user certainty factor can be preferentially selected as a sample.

In addition, it is preferable that, for example, a content more suitable for the user's preference, that is, a content having a higher predicted rating value, is selected as a sample in the content recommendation. Therefore, in addition to the above-mentioned conditions, a content having a higher predicted rating value can be preferentially selected. For example, a content can be selected as a sample in descending order of its score, where the score is calculated by an equation: predicted user certainty factor×predicted rating value/rating certainty factor.

In addition, in the case where there is a history that records contents used by the user (for example, a viewing history), a content that has been used by the user in the past can be preferentially selected while the above-mentioned conditions being taken into consideration. When it comes to unfamiliar samples that the user have not used, it is necessary for the user to actually use the samples or refer to additional information regarding the samples in order to assign rating information, so that it takes labor and time. Therefore, there is a low possibility that the samples are assigned rating information, so that it is expected that the rating information obtainable from the samples decreases. On the other hand, as for familiar samples that the user have ever used, the user can quickly assign rating information to the samples without actually using the samples or without referring to additional information regarding the samples. Therefore, there is a high possibility that the samples are assigned rating information, so that it is expected that the rating information obtainable from the samples increases. As a result, by preferentially selecting a content that the user have ever used as a sample, the rating information can be efficiently collected, and at the same time the accuracy of the rating prediction learning is improved as well.

Subsequently, the flow goes back to step S102, and the processes from step S102 to step S111 are repeated until it is judged that the completion condition is met at step S110. As described above, the active learning regarding rating prediction of contents is performed, the rating of each content is predicted, and a content is recommended to the user on the basis of the predicted ratings of the contents.

On the other hand, if it is judged that the completion condition is met at step S110, the rating prediction process is finished. Here, although the rating prediction process is finished, the content recommendation process is continued, and recommended items are continuously selected and presented to the user.

In this way, it becomes possible to make the active learning for rating prediction of contents more quickly converge, and at the same time the accuracy of the learning is improved. As a result, the prediction accuracy regarding the rating of each content is improved, a content more suitable for the user's preference can be recommended, and the user's satisfaction level for the service goes up.

Here, an algorithm for calculating a predicted rating value that is used for selecting a recommended item in the recommended item selection unit 122 and an algorithm for calculating predicted rating value in the rating prediction/certainty factor calculation unit 118 can be different from each other.

The above-described series of processes can be performed either by hardware or by software. If these series of processes are performed by software, programs that constitute the software are installed in a computer. Here, it is conceivable that a computer that is embedded in a dedicated hardware, a general-purpose computer capable of performing a variety of functions owing to a various programs installed thereon, or the like can play a role as the above-mentioned computer.

Figure 8:
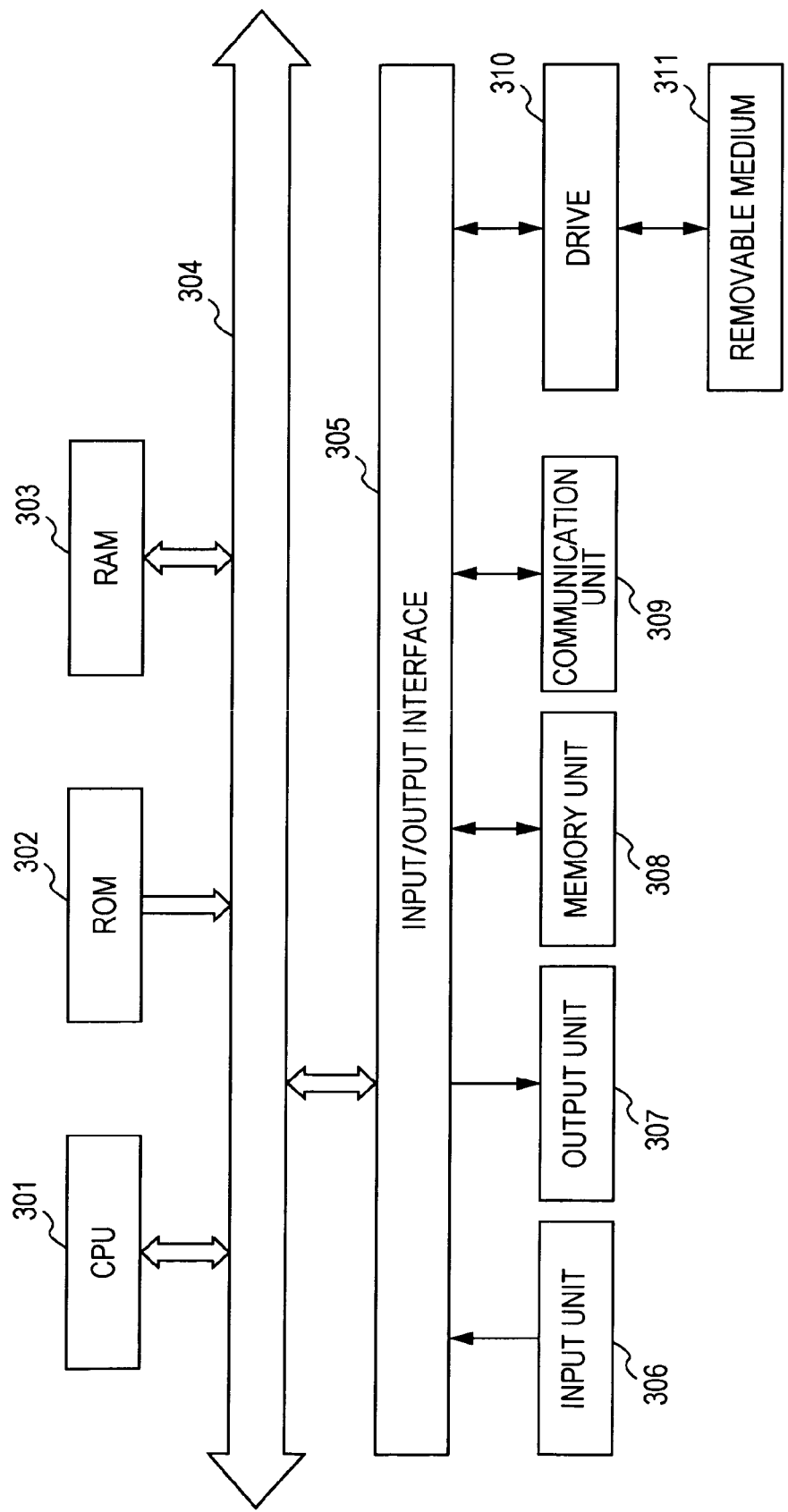
FIG. 8 is a block diagram showing a configuration example of a computer according to an embodiment of the present invention.

FIG. 8 is a block diagram showing a hardware configuration example of a computer that performs the above-described series of processes with the use of programs.

In this computer, a CPU (central processing unit) 301, a ROM (read only memory) 302, and a RAM (random access memory) 303 are connected to each other via a bus 304.

In addition, an input/output interface 305 is connected to the bus 304 as well. Connected to the input/output interface 305 are an input unit 306, an output unit 307, a memory unit 308, a communication unit 309, and a drive 310.

The input unit 306 is composed of a keyboard, a mouse, a microphone, and/or the like. The output unit 307 is composed of a display, a speaker, and/or the like. The memory unit 308 is composed of a hard disk, a non-volatile memory, and/or the like. The communication unit 309 is composed of a network interface, and/or the like. The drive 310 drives a removable medium 311 such as a magnetic disk, an optical disk, a magneto optical disk, a semiconductor memory, or the like.

In the computer configured as described above, the CPU 301 loads, for example, programs stored in the memory unit 308 via the input/output interface 305 and the bus 304 into the RAM 303, and executes the loaded programs, with the result that the above-described series of processes are performed.

For example, after being stored in the removable medium 311, which is a package medium or the like, the programs to be executed by the computer (CPU 301) can be provided for the computer from the removable medium 311. Alternatively, the programs can be provided for the computer via a wired or wireless transmission medium such as a local area network, the Internet, or a digital satellite broadcast.

In the computer, after the removable medium 311 is mounted on the drive 310, the programs can be installed in the memory unit 308 via the input/output interface 305. Alternatively, after being received by the communication unit 309 via a wired or wireless transmission medium, the programs can be installed in the memory unit 308. In addition, there can be another way that the programs are installed in the ROM 302 or the memory unit 308 in advance.

The programs executed by the computer can be executed in the chronological order described in this specification, can be executed in parallel, or can be executed at the time when any one of the programs is called or the like.

In this specification, the system refers to the entirety of an apparatus composed of plural devices.

The embodiments of the present invention are not limited to those described above, and various changes may be made without departing from the spirit of the present invention.

What is claimed is:
1. An information processing apparatus comprising:
label acquisition means for acquiring a label assigned by a user to a content selected among a plurality of contents;
user certainty factor setting means for setting a user certainty factor that refers to a certainty of the label assigned by the user;
wherein the user certainty factor setting means sets the user certainty factor on the bases of at least one of a necessary amount of time the user spends and the number of label changes made by the user until the user decides upon the label to be assigned to the content;
label prediction learning means for performing label prediction learning to predict the label on the basis of characteristics values of the content to which the label is assigned and the label;
label prediction means for predicting a label regarding a content to which the label is not assigned on the basis of the results of the label prediction learning and the characteristics values of the content, and for calculating a label certainty factor that refers to a certainty of the predicted label;
user certainty factor prediction means for performing user certainty factor prediction learning to predict the user certainty factor on the basis of the characteristics values of the content to which the label is assigned and the user certainty factor, and for predicting a user certainty factor of the predicted label regarding the content to which the label is not assigned on the basis of the results of the user certainty factor prediction learning and the characteristics values of the content; and
selection means for selecting a content to be next assigned a label among contents to which labels are not assigned.

2. The information processing apparatus according to claim 1, wherein
the user certainty factor setting means sets the user certainty factor on the basis of a variation among label values a plurality of users assign.

3. The information processing apparatus according to claim 1, wherein
the selection means selects a content to be next assigned the label on the basis of the idea that, the lower the label certainty factor and the higher the user certainty factor regarding the predicted label of a content are, the higher a priority assigned to the content is.

4. The information processing apparatus according to claim 3, wherein
if the label is a rating of a content, the selection means selects a content to be next assigned the label on the basis of the idea that, the higher the predicted rating value of the predicted label of a content is, the higher another priority newly assigned to the content is.

5. The information processing apparatus according to claim 4, wherein
the selection means selects a content to be next assigned the label on the basis of the idea that another priority is newly assigned to a content that has been used by the user in the past.

6. An information processing method comprising the steps of:
acquiring a label assigned by a user to a content selected among a plurality of contents;
setting a user certainty factor that refers to the certainty of the label assigned by the user;
wherein the user certainty factor is set on the basis of at least one of a necessary amount of time the user spends and the number of label changes made by the user until the user decides upon the label to be assigned to the content;
performing label prediction learning to predict the label on the basis of characteristics values of the content to which the label is assigned and the label;
predicting a label regarding a content to which the label is not assigned on the basis of the results of the label prediction learning and the characteristics values of the content, and calculating a label certainty factor that refers to a certainty of the predicted label;
performing user certainty factor prediction learning to predict the user certainty factor on the basis of the characteristics values of the content to which the label is assigned and the user certainty factor;
predicting a user certainty factor of the predicted label regarding the content to which the label is not assigned on the basis of the results of the user certainty factor prediction learning and the characteristics values of the content, and
selecting a content to be next assigned a label among contents to which labels are not assigned.

7. A program embodied in a non-transitory computer readable medium that causes a computer to execute processing including the steps of:
acquiring a label assigned by a user to a content selected among a plurality of contents;
setting a user certainty factor that refers to a certainty of the label assigned by the user;
wherein the user certainty factor is set on the basis of at least one of a necessary amount of time the user spends and the number of label changes made by the user until the user decides upon the label to be assigned to the content;
performing label prediction learning to predict the label on the basis of characteristics values of the content to which the label is assigned and the label;
predicting a label regarding a content to which the label is not assigned on the basis of the results of the label prediction learning and the characteristics values of the content, and calculating a label certainty factor that refers to a certainty of the predicted label;
performing user certainty factor prediction learning to predict the user certainty factor on the basis of the characteristics values of the content to which the label is assigned and the user certainty factor;
predicting a user certainty factor of the predicted label regarding the content to which the label is not assigned on the basis of the results of the user certainty factor prediction learning and the characteristics values of the content, and
selecting a content to be next assigned a label among contents to which labels are not assigned.

8. An information processing apparatus comprising:
a label acquisition section configured to acquire a label assigned by a user to a content selected among a plurality of contents;
a user certainty factor setting section configured to set a user certainty factor that refers to a certainty of the label assigned by the user;
wherein the user certainty factor setting section sets the user certainty factor on the bases of at least one of a necessary amount of time the user spends and the number of label changes made by the user until the user decides upon the label to be assigned to the content;
a label prediction learning section configured to perform label prediction learning to predict the label on the basis of characteristics values of the content to which the label is assigned and the label;
a label prediction section configured to predict a label regarding a content to which the label is not assigned on the basis of the results of the label prediction learning and the characteristics values of the content, and to calculate a label certainty factor that refers to a certainty of the predicted label;
a user certainty factor prediction section configured to perform user certainty factor prediction learning to predict the user certainty factor on the basis of the characteristics values of the content to which the label is assigned and the user certainty factor, and configured to predict a user certainty factor of the predicted label regarding the content to which the label is not assigned on the basis of the results of the user certainty factor prediction learning and the characteristics values of the content; and
a selection section configured to select a content to be next assigned a label among contents to which labels are not assigned;
Wherein at least one of the label acquisition section, user certainty factor setting section, label prediction learning section, label prediction section, user certainty factor prediction section, and selection section includes a processor.

* * * * *